US011611310B2

(12) United States Patent
Stephan et al.

(10) Patent No.: US 11,611,310 B2
(45) Date of Patent: Mar. 21, 2023

(54) HINGED SOLAR MOUNT

(71) Applicant: PEGASUS SOLAR, INC., Richmond, CA (US)

(72) Inventors: Erich Kai Stephan, Richmond, CA (US); Glenn Harris, Richmond, CA (US); Peter Wilke, Richmond, CA (US); Nicholas Wenzel, Richmond, CA (US); James Hsieh, Richmond, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 0 days.

(21) Appl. No.: 17/155,624

(22) Filed: Jan. 22, 2021

(65) Prior Publication Data

US 2022/0239247 A1 Jul. 28, 2022

(51) Int. Cl.
*H02S 20/30* (2014.01)
*H02S 20/23* (2014.01)

(52) U.S. Cl.
CPC .............. *H02S 20/30* (2014.12); *H02S 20/23* (2014.12)

(58) Field of Classification Search
None
See application file for complete search history.

(56) References Cited

U.S. PATENT DOCUMENTS

| 3,966,342 | A | 6/1976 | Moriya | |
|---|---|---|---|---|
| 4,907,388 | A | 3/1990 | Siahatgar | |
| 5,657,604 | A | 8/1997 | Malott | |
| 6,205,719 | B1 | 3/2001 | Bruce | |
| 8,375,661 | B1 * | 2/2013 | diGirolamo | E04B 5/10 |
| | | | | 52/223.13 |
| 8,893,445 | B2 * | 11/2014 | Yen | F24S 25/636 |
| | | | | 52/173.3 |
| 8,938,932 | B1 * | 1/2015 | Wentworth | F24S 25/61 |
| | | | | 52/173.3 |
| 9,181,705 | B2 * | 11/2015 | Lanza | E04D 1/30 |
| 10,288,319 | B2 * | 5/2019 | Li | F24S 25/636 |
| 11,336,222 | B1 * | 5/2022 | Garza | H02S 30/00 |
| 2009/0114269 | A1 * | 5/2009 | Fletcher | H02S 20/23 |
| | | | | 136/251 |

(Continued)

OTHER PUBLICATIONS

Invitation to Pay Additional Fees and, Where Applicable, Protest Fee, from the International Searching Authority, dated May 13, 2021, 2 pages, for corresponding International Patent Application No. PCT/US2021/020708.

(Continued)

*Primary Examiner* — Steven M Marsh
(74) *Attorney, Agent, or Firm* — Polsinelli LLP; Tam Thanh Pham; Ruby Chung (57) ABSTRACT

A solar mount, for use with a bracket attachment, has an open and a closed state. In the open state, grip flanges on two hinged arms can pass through a slot opening on the bracket attachment. In the closed state, the grip flanges cooperate with respective groves in the bracket attachment to secure the solar mount to the bracket attachment. In the closed state, a fastener attaches a solar accessory, such as a rail, and holds the two hinged arms together. A flexible mount helps hold the two hinged arms together in the open state, and also helps hold the two hinged arms in the closed state.

18 Claims, 11 Drawing Sheets

(56) References Cited

U.S. PATENT DOCUMENTS

2013/0121760 A1   5/2013   Chen et al.
2016/0268958 A1   9/2016   Wildes et al.

OTHER PUBLICATIONS

International Search Report and Written Opinion from the International Searching Authority, dated Jul. 21, 2021, 13 pages, for corresponding International Patent Application No. PCT/US2021/020708.

* cited by examiner

HINGED SOLAR MOUNT

BACKGROUND

Current rooftop solar arrays are mounted to brackets that can be difficult to install onto a roof surface. When the mounts include more than one piece, keeping the pieces together before installation can present challenges. A multi-piece mount that keeps the multiple pieces together before installation is needed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
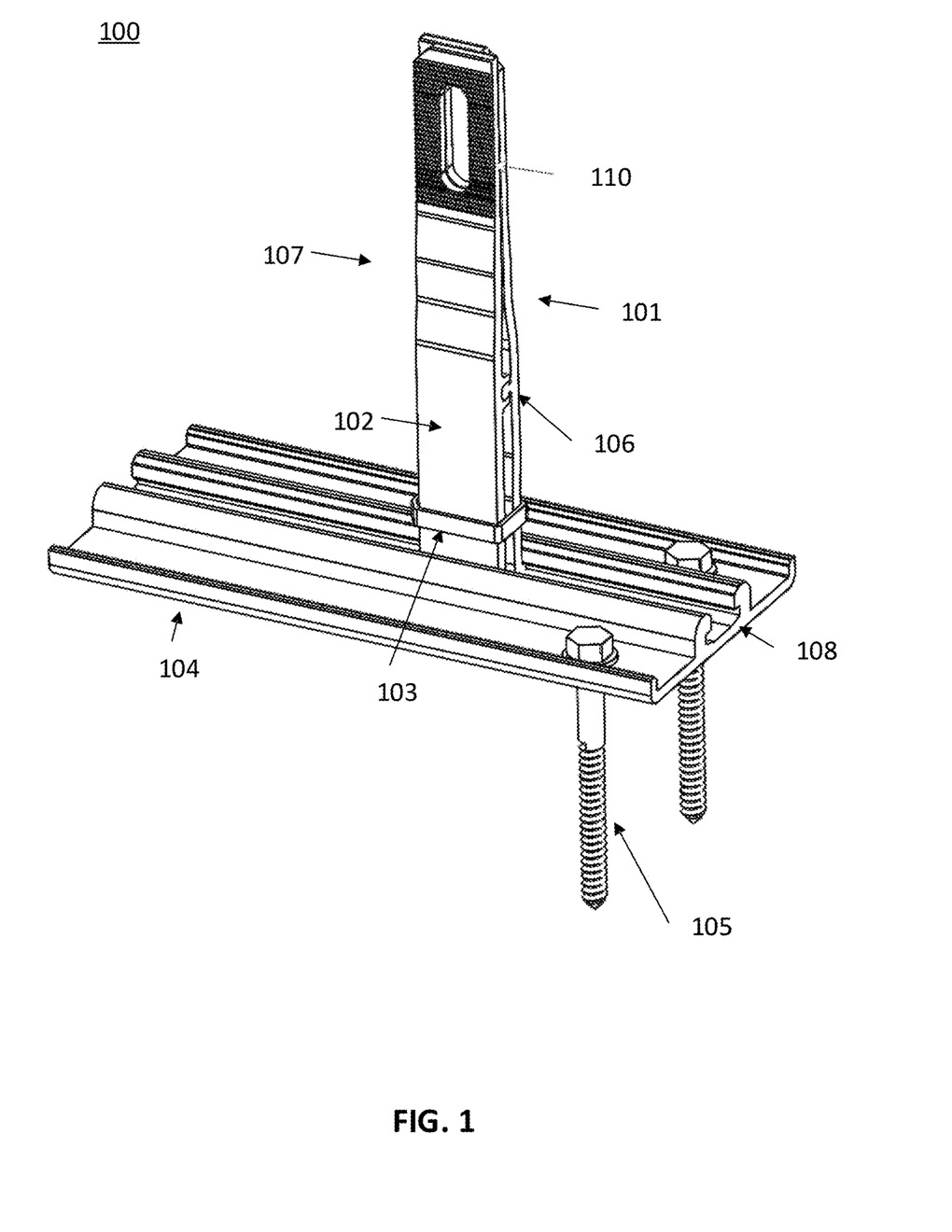
FIG. 1 illustrates a mount and attachment bracket in a closed state.

FIG. 1 illustrates an isometric view of the Grip Mount 100. The Grip Mount 100 consists of a Grip Arm 107 and an Attachment Bracket 104. The Grip Arm 107 consists of a First Arm 101 and a Second Arm 102 joined at Hinge 106. As illustrated, one portion of Second Arm 102 has a grooved surface 110. In some exemplary embodiments, a Flexible Member 103 flexibly secures the First Arm 101 and Second Arm 102 together. Attachment Bracket 104 may have one or more apertures through which Roof Fastener 105 passes in order to secure the Attachment Bracket 104 to a roof surface. Attachment bracket 104 has a laterally positioned Grip Slot 108 that is centrally located and extends the length of Attachment Bracket 104. The Attachment Bracket 104 may have one or more apertures disposed on opposite sides of the Grip Slot 108 configured to receive one or more Roof Fasteners 105, wherein said apertures are offset towards one edge of the Attachment Bracket 104.

Figure 2A:
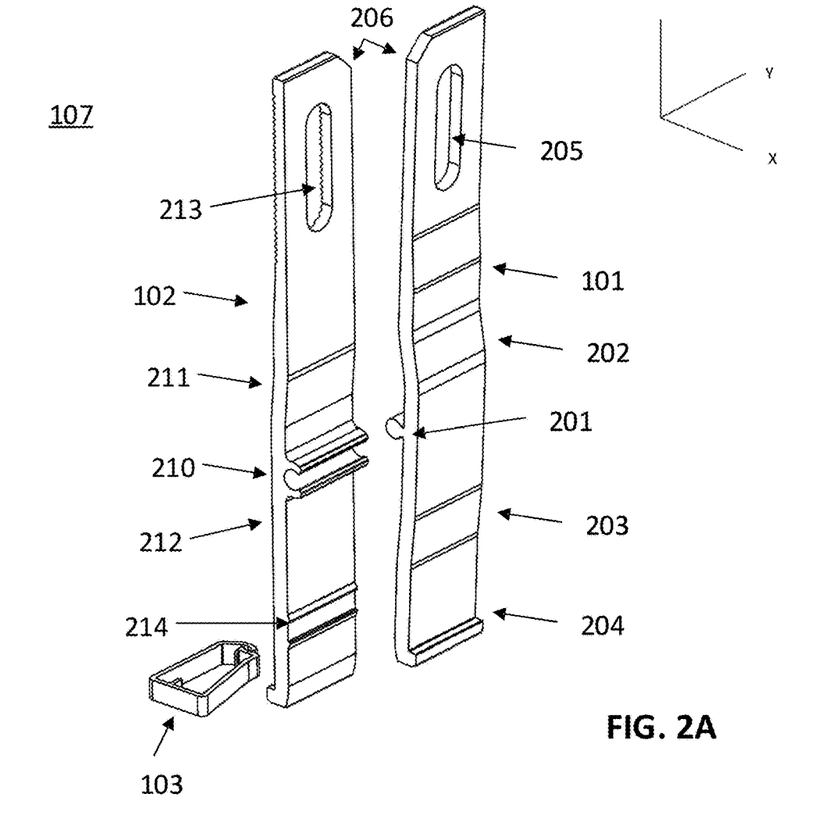
FIG. 2A illustrates an exploded view of a mount.

FIG. 2A illustrates the Grip Arm 107 un-assembled for clearer interpretation. In this view, First Arm 101, Second Arm 102, and Flexible Member 103 are dis-assembled from one another. First Arm 101 has a pivot ridge or Hinge Ball 201 disposed on one side that runs the width of the main body. The pivot ridge or Hinge Ball 201 may have a substantially circular shape disposed at the end of a web with a thinner cross section relative to the diameter of the circular shape. First Arm 101 may also have a First Upper Jog 202 and First Lower Jog 203, above and below respectively, from the Hinge Ball 201. Grip Flange 204 is located at a distal end of First Arm 101, and extends substantially orthogonal to the First Arm 101 on the opposite surface from the pivot ridge or Hinge Ball 201. First Arm 101 may have a First Aperture 205 through the main body above the First Upper Jog 202. As illustrated in FIG. 2A, the surface of the main body of First Arm 101 may be relatively smooth, or it may have a serrated or grooved surface in the area around the First Aperture 205 as seen in FIG. 1. First Arm 101 and Second Arm 102 may also have Chamfers 206 on one corner each, and on opposite corners. Chamfers 206 being on opposite corners when the First Arm 101 and Second Arm 102 are assembled assist in separating the two arms, particularly when the two arms are held together. Second Arm 102 has a pivot surface or Hinge Socket 210 disposed on one side that runs the width of the main body. Pivot surface or Hinge Socket 210 has a geometry configured to receive pivot ridge or Hinge Ball 201 as slid in from the side, i.e. along the length of the pivot surface or Hinge Socket 210 and pivot ridge or Hinge Ball 201. Pivot surface or Hinge Socket 210 and pivot ridge or Hinge Ball 201 are dimensioned to secure First Arm 101 to Second Arm 102 to limit movement in the Z and X directions, while allowing the Second Arm 102 to rotate axially around the Hinge 106 towards or away from the First Arm 101. The First Arm 101 and Second Arm 102 will be able to rotate around the Hinge 106 towards one another until the First Arm 101 and Second Arm 102 interfere with one another at their respective distal ends. Second Arm 102 has a Second Upper Jog 211 and Second Lower Jog 212 located above and below the Hinge Socket 210, respectively. Second Arm 102 may also have a Retention Groove 214 to engage a surface on Flexible Member 103 to prevent Flexible Member 103 from substantially moving in the Z direction after being installed onto the Second Arm 102. Second Arm 102 also has another Grip Flange 204 located at the distal end furthest from the Second Aperture 213.

As illustrated in FIG. 2A, First Aperture 205 and Second Aperture 213 can be slotted and they are positioned a substantially similar distance from the Hinge 106 such that when the First Arm 101 and Second Arm 102 are rotated around the Hinge 106 until the upper portion of each arm coincides, the two apertures are generally aligned. Likewise, the Grip Flanges 204 are positioned a substantially similar distance from the Hinge 106 such that when the First Arm 101 and Second Arm 102 are rotated around the Hinge 106 until the upper portion of each arm coincides, the top edges of each Grip Flange 204 are substantially coincident.

The Grip Arm 107 may be assembled by sliding the Hinge Ball 201 into the Hinge Socket 210 until the edges of First Arm 101 and Second Arm 102 are substantially coincident. A next step may be expanding open the free end of the Flexible Member 103 and installing the Flexible Member 103 around the First Arm 101 and Second Arm 102. The Flexible Member may have a rib to reside in the Retention Groove 214 to prevent the Flexible Member from moving up or down the First Arm 101 or Second Arm 102.

Figure 2B:
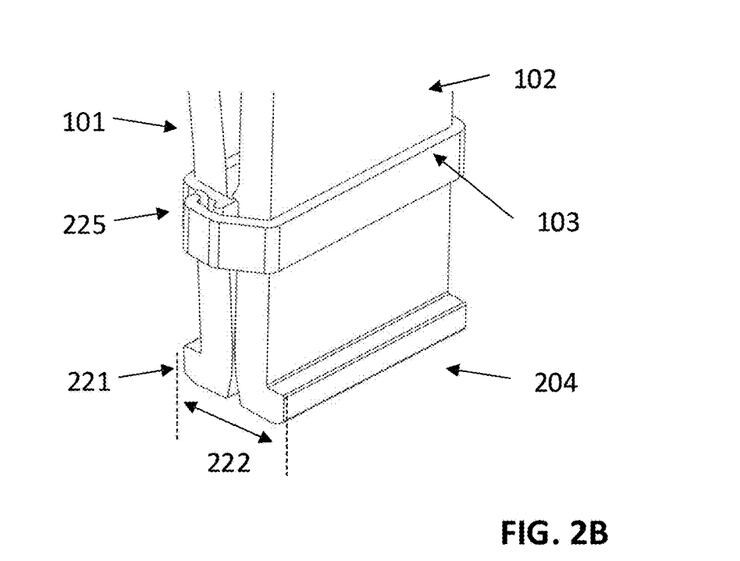
FIG. 2B illustrates grip flanges and a flexible member of a mount in an open state.

FIG. 2B. is a close-up view of the lower distal end of Grip Arm 107 fully assembled showing the Grip Flanges 204 and the Flexible Member 103. Assembled, when the First Arm 101 and Second Arm 102 rotate around Hinge 106 so that they touch near the lower portion of their respective bodies near the Grip Flanges 204, the Grip Arm 107 is in an "open" state. The Flexible Member 103 is compressibly holding the Grip Arm 107 in an open state when no other forces are induced on the assembly. When the First Arm 101 and Second Arm 102 rotate around Hinge 106 so that they touch near First Aperture 205 and Second Aperture 213, the Grip Arm 107 is in a "closed" state.

As illustrated in FIG. 2B, Flexible Member 103 may have on its open side Locking Teeth 225 that are over lapping when the Grip Arm 107 is in an open state. When the Grip Arm 107 is transitioning to a closed state, the Locking Teeth 225 are forcibly moved past each another. In the closed state, the outer edges of the Locking Teeth 225 may rest against one another to resist the compressive force of the Flexible Member 103, maintaining the Grip Arm 107 in a closed state. Grip Flanges 204 may have Grip Chamfers 221 on the lower distal ends. In the open state, the Grip Distance 222 is measured across the width of the Grip Flanges 204.

Figure 3:
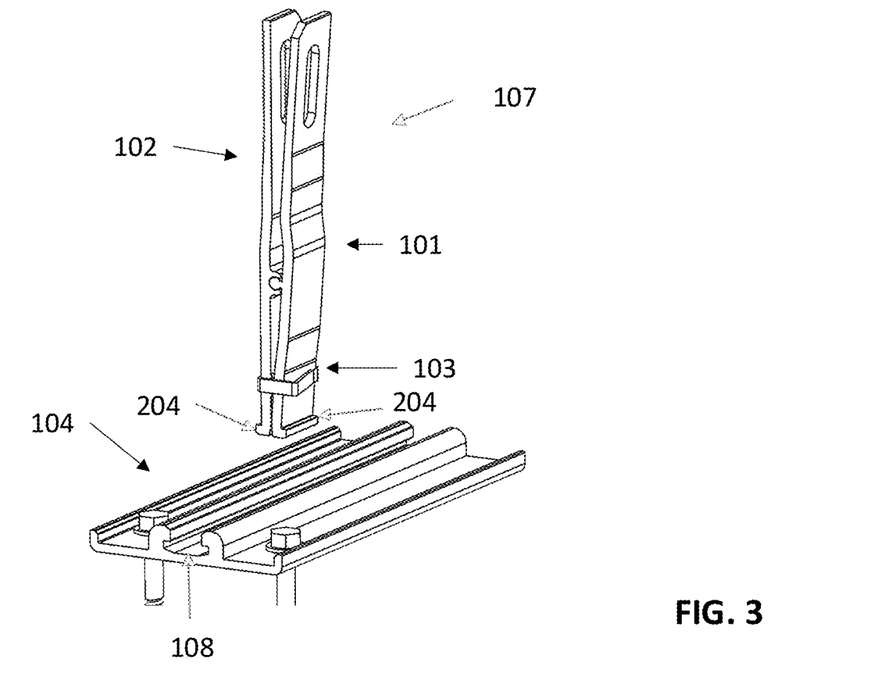
FIG. 3 illustrates a mount and attachment bracket in an open state.
Figure 4:
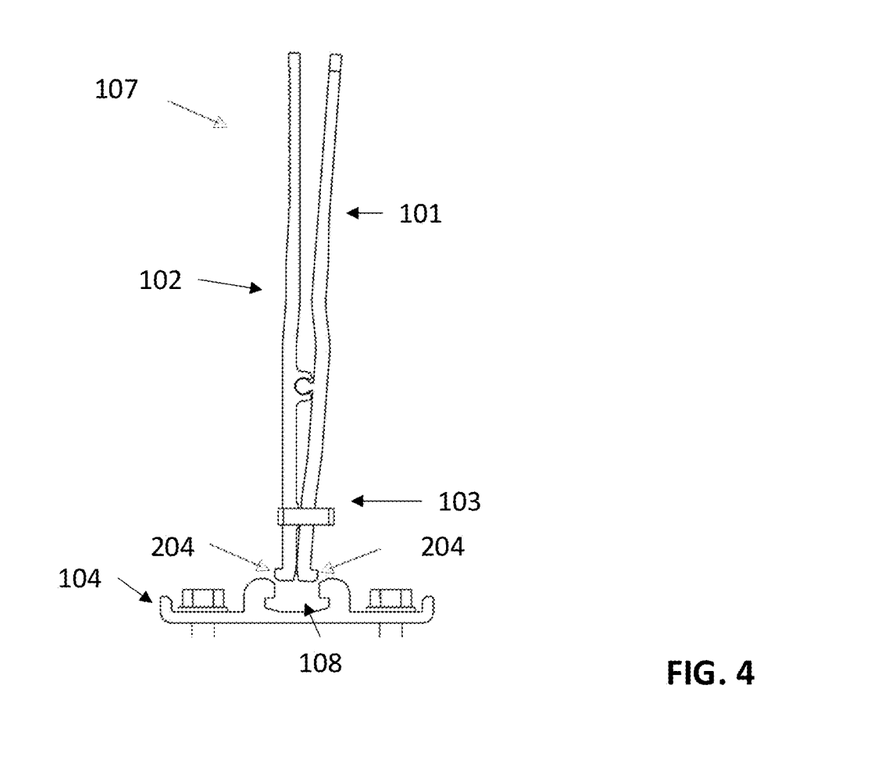
FIG. 4 illustrates an end view of a mount and attachment bracket in an open state.

FIG. 3 illustrates the Grip Arm 107 in an open state, positioned over the Attachment Bracket 104. FIG. 4 is an end view depicting the same as FIG. 3. The Flexible Member 103 is maintaining the Grip Arm 107 in the open state. The Grip Arm 107 is positioned anywhere along the length of the Grip Slot 108, with the length of the Grip Flanges 204 substantially parallel with the length of the Grip Slot 108. Grip Slot 108 has a top opening slightly larger than the Grip Distance 222 when the Grip Arm 107 is in the open state.

Figure 5:
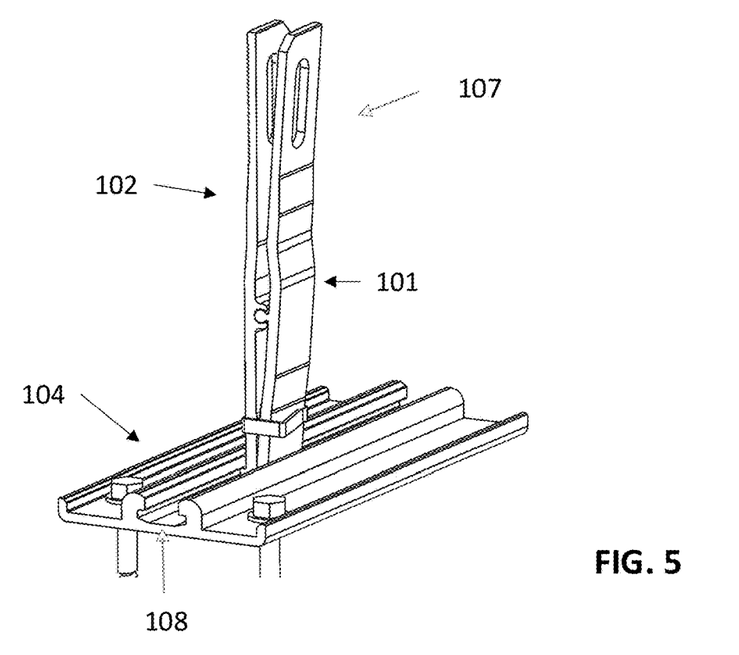
FIG. 5 illustrates a mount and attachment bracket in an open state with grip flanges of the mount inserted in a grip slot of the attachment bracket.
Figure 6:
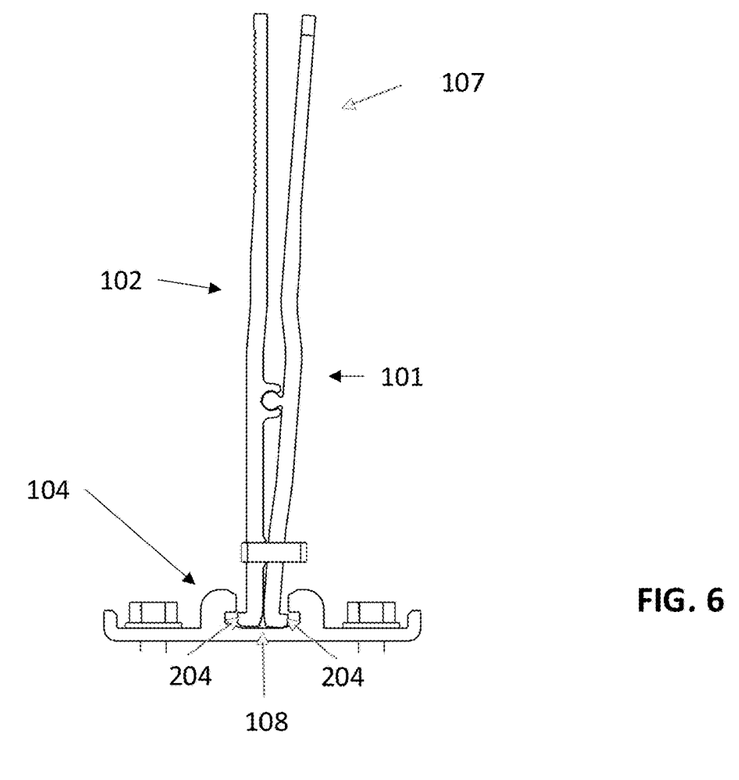
FIG. 6 illustrates an end view of a mount and attachment bracket in an open state with grip flanges of the mount inserted in a grip slot of the attachment bracket.

FIG. 5 illustrates the Grip Arm 107 in an open state, inside the Grip Slot 108. FIG. 6 is an end view and illustrates the same as FIG. 5. The Grip Arm 107 is lowered so that the Grip Flanges 204 are inside of the Grip Slot 108. While the Second Arm 102 is shown nearly vertical with the First Arm 101 at an angle relative to vertical, the entire Grip Arm 107 may be at any angle relative to the Attachment Bracket 104 to facilitate the installation of the Grip Arm 107 into the Grip Slot 108.

Figure 7:
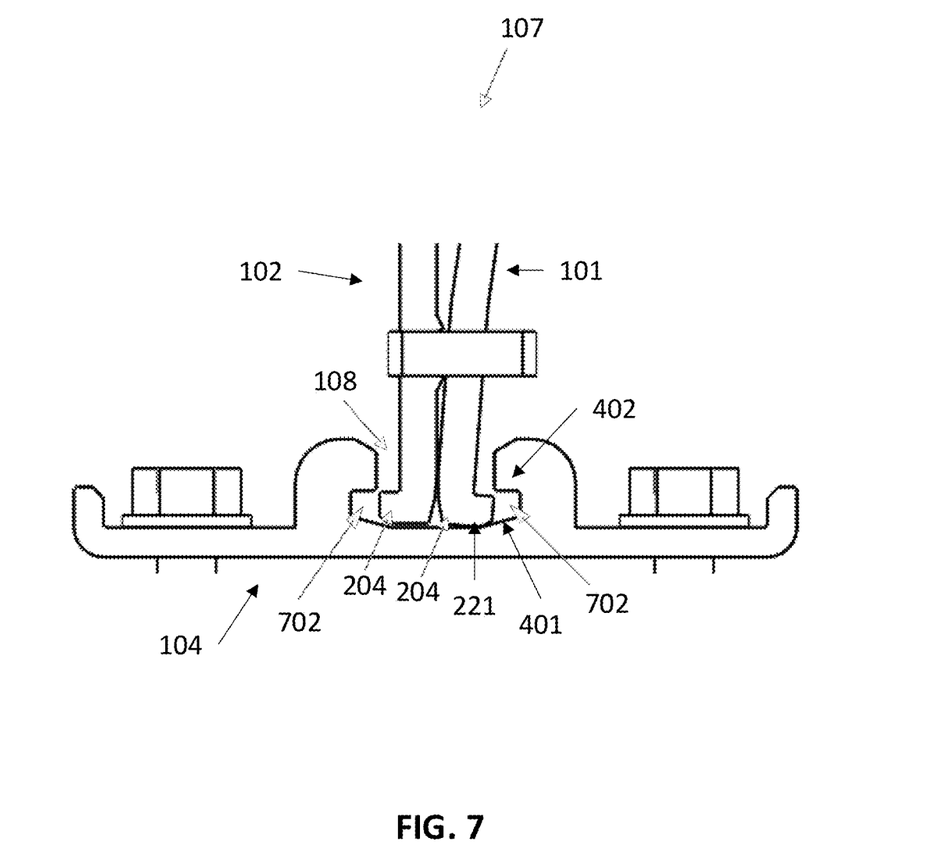
FIG. 7 illustrates an end view of a mount and attachment bracket in an open state with grip flanges of the mount inserted in a grip slot of the attachment bracket.

FIG. 7 is a close-up view of FIG. 6 providing more detail of the interaction between the Grip Flanges 204 and Grip Slot 108. Grip Slot 108 may have Inclined Surface 401 along its length on the lower surface as shown. In this way, the laterally opposed channels 702 of the Grip Slot 108 are tapered from the opening toward the bottom of the channel. Inclined Surface 401 is configured to interact with Grip Chamfers 221 as the Grip Arm 107 transitions from an open state to a closed state so that the top surface of the Grip Flanges 204 are compressed against the underside upper wall of Slot Flange 402. In other words, when the Grip Arm 107 is in a closed state, the Grip Flanges 204 are wedged between the Inclined Surface 401 and underside surface of the Slot Flange 402. In this way, each Grip Flange 204 cooperates with a tapered channel 702 on the Attachment Bracket 104.

Figure 8:
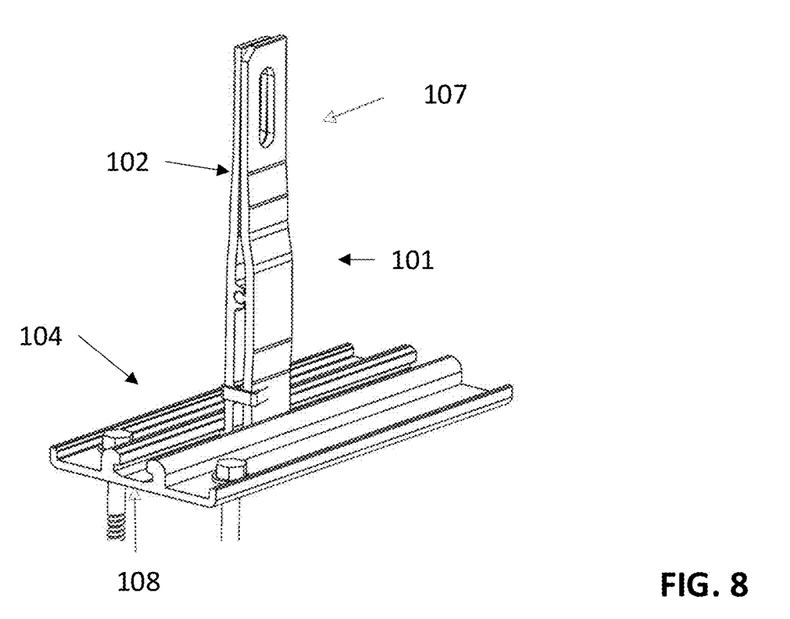
FIG. 8 illustrates a mount and attachment bracket in a closed state with grip flanges of the mount inserted in a grip slot of the attachment bracket.
Figure 9:
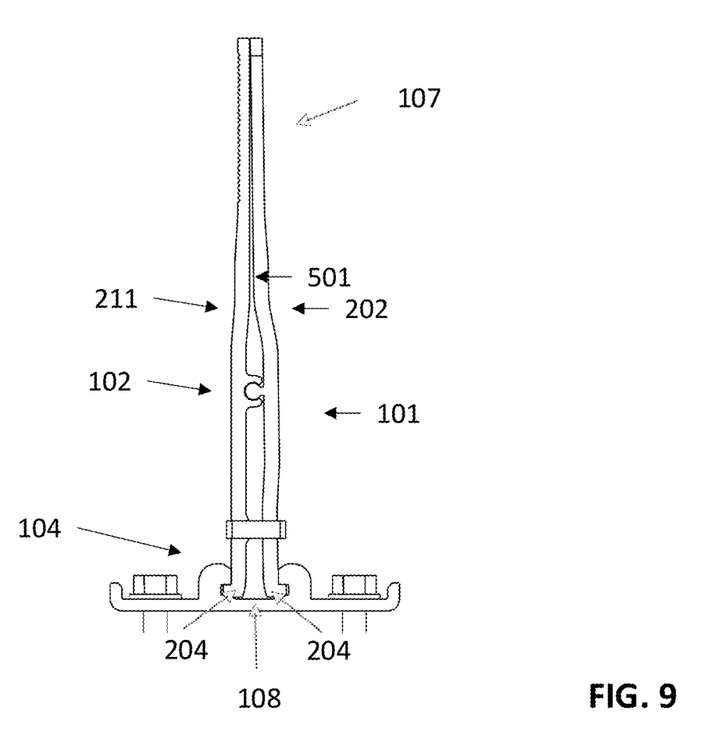
FIG. 9 illustrates an end view of a mount and attachment bracket in a closed state with grip flanges of the mount inserted in a grip slot of the attachment bracket.

FIG. 8 illustrates the Grip Arm 107 in a closed state, where Grip Flanges 204 are fully engaged with the Inclined Surfaces 401 and underside surface of Slot Flanges 402. FIG. 9 is an end view illustrated the same as FIG. 8. In this example embodiment, First Upper Jog 202 and Second Upper Jog 211 position the upper portion of the First Arm 101 and Second Arm 102 to reserve a small Gap 501 between their respective inner surfaces. As previously described, FIG. 6 illustrates an open state and FIG. 9 illustrated a closed state. In the open state, the distance between the outer ends of the Grip Flanges 204 is less than the opening width of the Grip Slot 108. In the closed state, the distance between the outer ends of the Grip Flanges 2104 is greater than the opening width of the Grip Slot 108.

Figure 10:
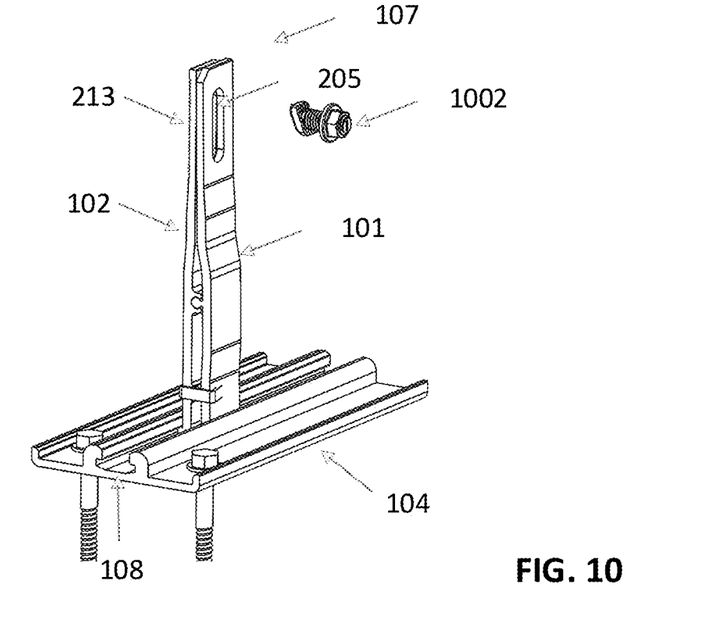
FIG. 10 illustrates a fastener, a mount and attachment bracket in a closed state with grip flanges of the mount inserted in a grip slot of the attachment bracket.
Figure 11:
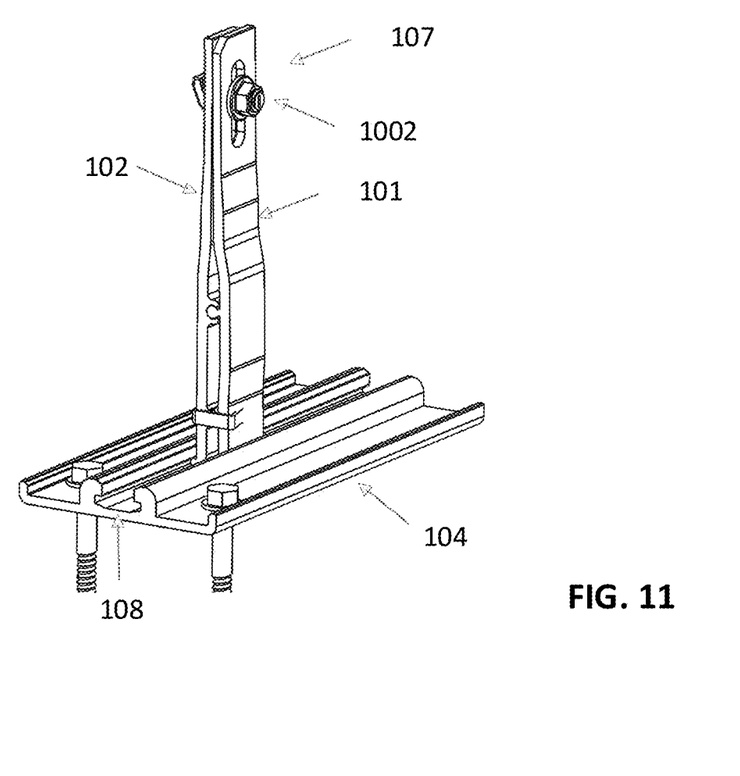
FIG. 11 illustrates a fastener inserted through apertures in a mount and attachment bracket in a closed state with grip flanges of the mount inserted in a grip slot of the attachment bracket.
Figure 12:
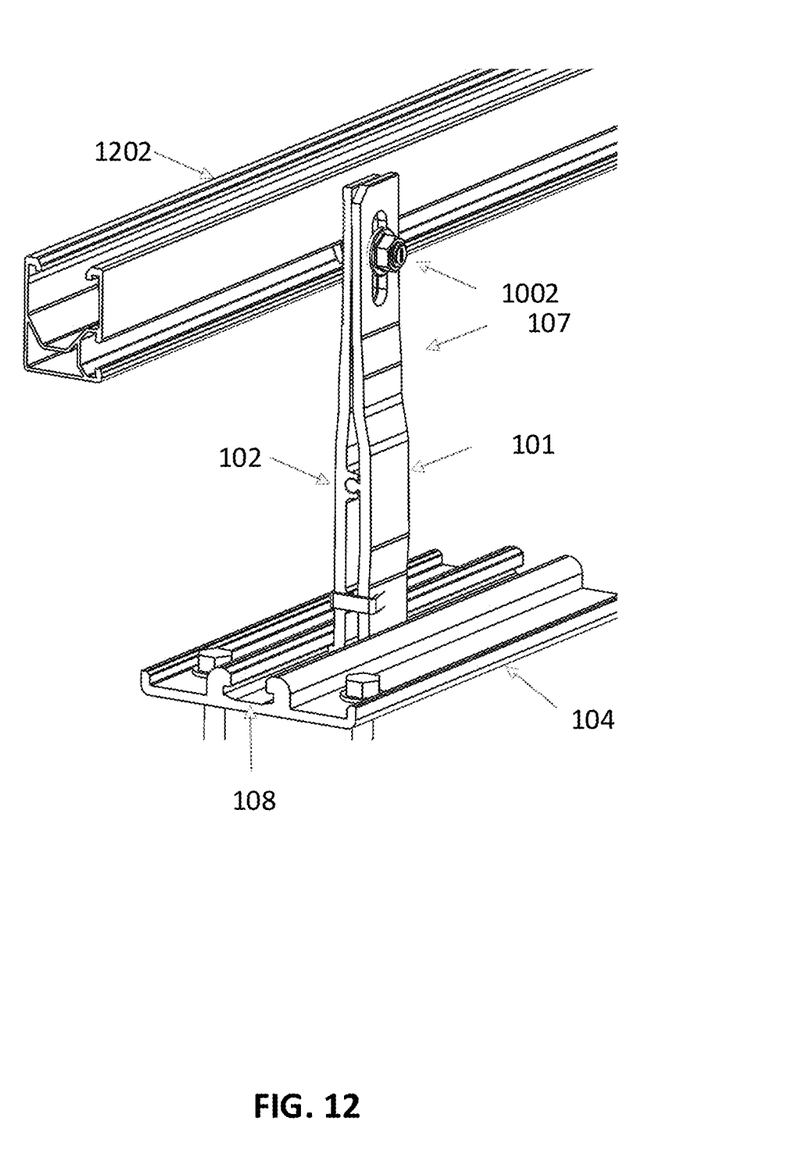
FIG. 12 illustrates a rail attached to a mount with a fastener, the mount and attachment bracket in a closed state with grip flanges of the mount inserted in a grip slot of the attachment bracket.

FIGS. 10 through 12 illustrate an example final installation sequence to structurally secure the Grip Arm 107 to the Attachment Bracket 104. In the installation, an attachment bolt 1002 is inserted through the apertures 205 and 213, the attachment bolt 1002 engages with a rail 1202 (illustrated in FIG. 12), and then upon tightening the attachment bolt 1002, the Gap 501 is fully closed and the Grip Flanges 204 are firmly seated into the Grip Slot 108.

Figure 13:
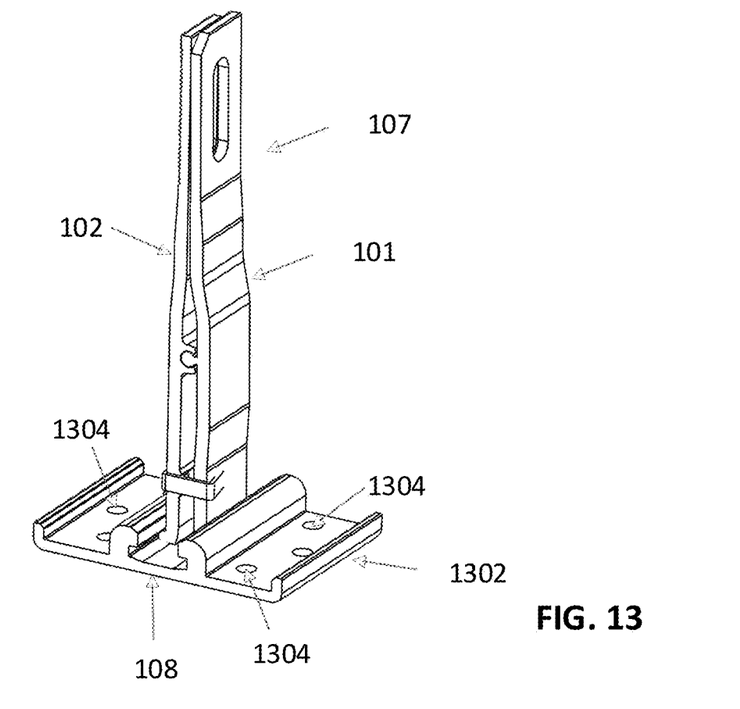
FIG. 13 illustrates an alternative embodiment of a mount and attachment bracket in a closed state with grip flanges of the mount inserted in a grip slot of the attachment bracket.

FIG. 13 illustrates an alternative embodiment, with a Deck Attachment Bracket 1302 instead of the Attachment Bracket 104. In this example embodiment, the Deck Attachment Bracket 1302 may be substantially shorter in length as compared to the Attachment Bracket 104. The Deck Attachment Bracket 1302 may include multiple apertures 1304 evenly spaced along the length of the Deck Attachment Bracket on either side of the Grip Slot 108. In this embodiment, multiple fasteners (not illustrated) connect the Deck Attachment Bracket 1302 to a roof surface through these apertures, rather than the two fasteners into a roof truss (i.e. a roof structural member).

Figure 14:
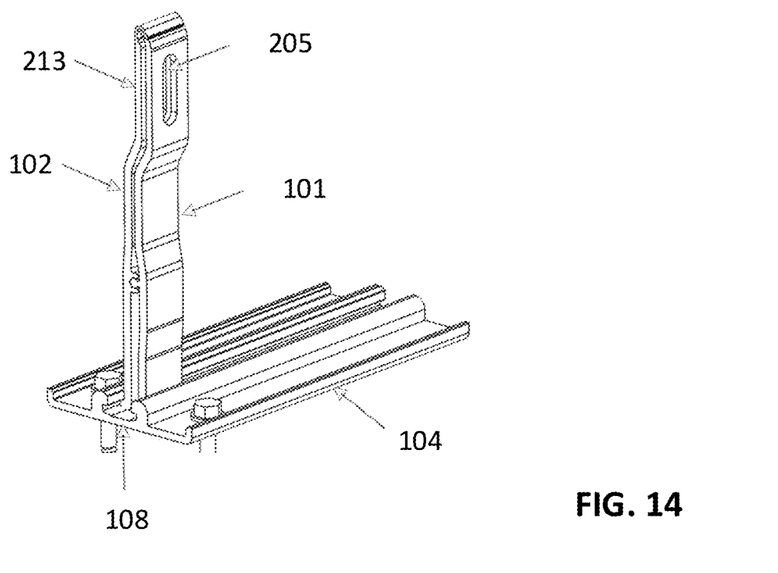
FIG. 14 illustrates an alternative embodiment of a mount and attachment bracket in a closed state with grip flanges of the mount inserted in a grip slot of the attachment bracket.

FIG. 14 illustrates an alternative embodiment, where the First Arm 101 and Second Arm 102 are configured to interlock together in a closed state, eliminating the need for a flexible member 103 and Locking Teeth 225 (see FIG. 2B). Additionally, the jogs in the first and second arms nest together and allow for aperture 205 & 213 to be offset from Grip Slot 108.

Figure 15:
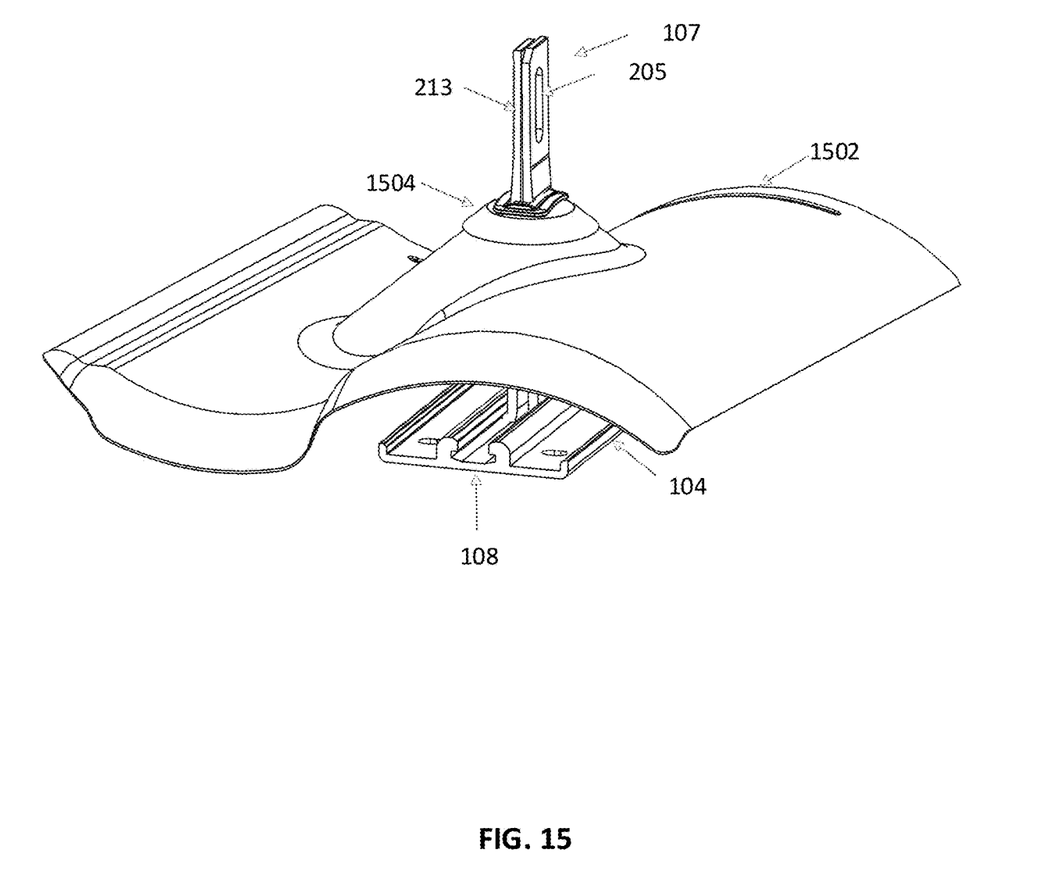
FIG. 15 illustrates roof flashing with a mount and attachment bracket.

FIG. 15 illustrates use of the assembly with a roof flashing 1502 and sealing boot 1504. In this example embodiment of the present invention, the Attachment Bracket 104 may be first installed on roof surface. Then, the roof flashing 1502 may be positioned over the Attachment Bracket 104 so that an aperture in the roof flashing 1502 is generally located over the Grip Slot 108. Then the Grip Arm 107 may traverse through the aperture in the roof flashing 1502 to engage with the Grip Slot 108 as previously described. A flexible sealing boot 1504 may be installed over the Grip Arm 107 and positioned snug against the top surface of the roof flashing 1502. The flexible sealing boot 1504 may aid in maintaining the Grip Arm 107 in a semi-closed state. Finally, a fastener (not illustrated) may be installed through the First and Second apertures 205 and 213 on the Grip Arm 107 to attach a desired rail (not illustrated). As previously described, when the fastener is tightened, the Grip Flanges 204 will be firmly secured into the Grip Slot 108.

Figure 16:
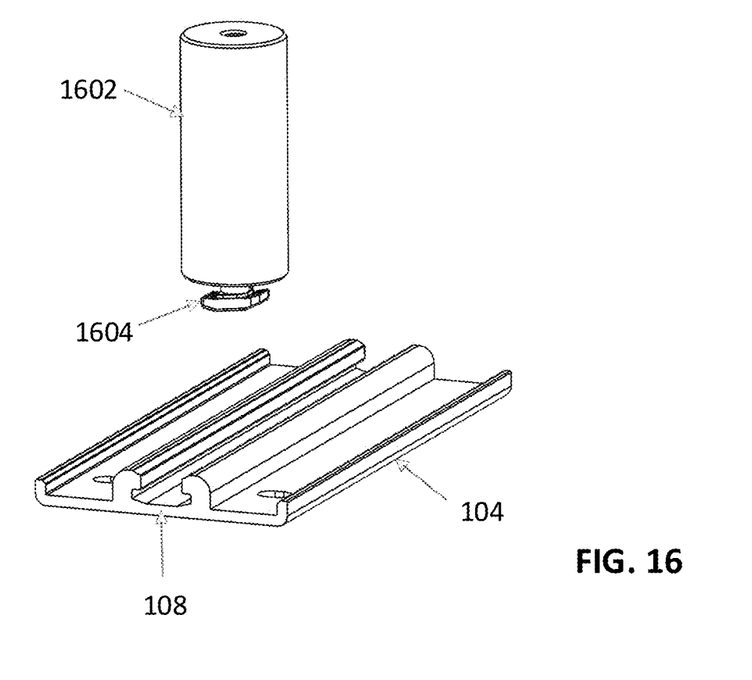
FIG. 16 illustrates an alternative embodiment of an attachment bracket used with a post and T-bolt.
Figure 17:
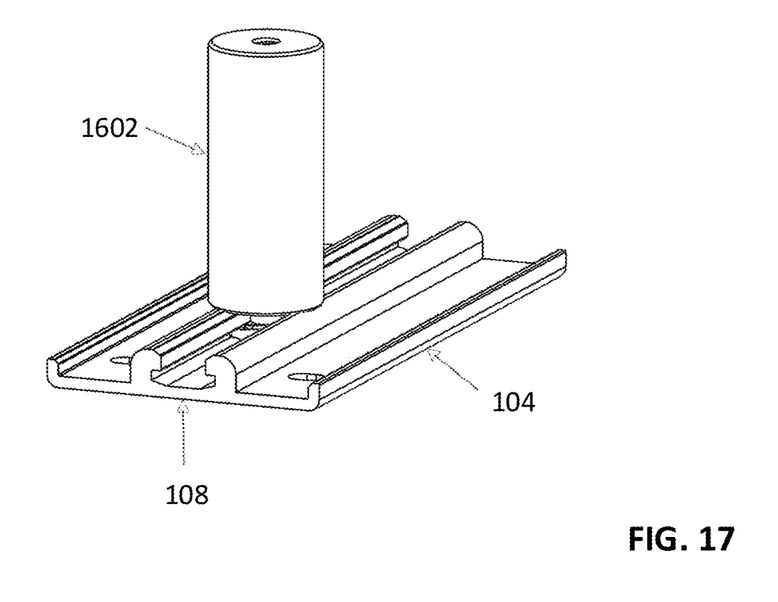
FIG. 17 illustrates an alternative embodiment of an attachment bracket used with a post and T-bolt.

FIGS. 16 and 17 illustrate an alternative embodiment where a post 1602 with T-bolt 1604 is used with Attachment Bracket 104 or Deck Attachment Bracket 1302 (not illustrated).

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A solar mount, comprising:
a first arm, the first arm comprising at least:
a first aperture at a first distal end of the first arm;
a first grip flange at a second distal end of the first arm;
a pivot ridge between the first distal end and the second distal end of the first arm;
the pivot ridge and the first grip flange on opposite sides of the first arm;
a second arm, the second arm comprising at least:
a second aperture at a first distal end of the second arm;
a second grip flange at a second distal end of the second arm; and
a pivot surface between the first distal end and the second distal end of the second arm, the pivot surface and the second grip flange on opposite sides of the second arm, the pivot surface cooperating with the pivot ridge to act as a hinge in an assembled configuration of the first arm and the second arm;
an attachment bracket, the attachment bracket comprising a grip slot that cooperates with the first grip flange and the second grip flange; and
a rail that attaches to the first and second arms using the first and second apertures, wherein the grip slot of the attachment bracket is substantially parallel to the rail.

2. The solar mount of claim 1, further comprising a flexible member that cooperates with a retention groove on one of the first arm or the second arm.

3. The solar mount of claim 1, wherein the pivot ridge is a hinge ball.

4. The solar mount of claim 1, wherein the pivot surface is a hinge socket.

5. The solar mount of claim 1, further comprising a corner chamfer on at least one corner of the first distal end of the first arm.

6. The solar mount of claim 1, further comprising a grooved surface on at least one of the first distal end of the first arm, or the first distal end of the second arm.

7. The solar mount of claim 1, wherein a first distance between outer ends of the first grip flange and the second grip flange when the first arm and the second arm are in an open state is less than a grip slot opening width of the attachment bracket.

8. The solar mount of claim 1, wherein a first distance between outer ends of the first grip flange and the second grip flange when the first arm and the second arm are in a closed state is greater than a grip slot opening width of the attachment bracket.

9. The solar mount of claim 1, further comprising a jog on the first arm between the first aperture and the pivot ridge.

10. The solar mount of claim 1, further comprising a jog on the first arm between the pivot ridge and the first grip flange.

11. The solar mount of claim 1, wherein the first grip flange is tapered to cooperate with a tapered grove on the attachment bracket.

12. An attachment bracket comprising:
a central grip slot, the central grip slot having at least a first tapered surface and a second tapered surface, the first tapered surface cooperating with a first grip flange of a mount, and the second tapered surface cooperating with a second grip flange of the mount; and
at least one aperture located between the central grip slot and an edge of the attachment bracket, the aperture configured to allow a fastener to pass therethrough and attach the attachment bracket to a roof.

13. A method of installing a solar mount, comprising:
inserting a first grip flange of a first arm and a second grip flange of a second arm in a grip slot of an attachment bracket, the first arm and the second arm rotatable about a pivot ridge on the second arm;
moving a first distal end of the first arm toward a second distal end of the second arm;
inserting a fastener through a first aperture at the first distal end and through a second aperture at the second distal end; and
securing a rail to the first and second arms.

14. The attachment bracket of claim 12, wherein the at least one aperture is configured to receive a fastener for securing the attachment bracket onto an installation surface.

15. A solar mount, comprising:
a first arm, the first arm comprising at least:
a first slotted aperture at a first distal end of the first arm;
a first grip flange at a second distal end of the first arm;
a pivot ridge between the first distal end and the second distal end of the first arm; the pivot ridge and the first grip flange on opposite sides of the first arm; and
a second arm, the second arm comprising at least:
a second slotted aperture at a first distal end of the second arm;
a second grip flange at a second distal end of the second arm; and
a pivot surface between the first distal end and the second distal end of the second arm, the pivot surface and the second grip flange on opposite sides of the second arm, the pivot surface cooperating with the pivot ridge to act as a hinge in an assembled configuration of the first arm and the second arm.

16. The solar mount of claim 15, wherein a first distance between outer ends of the first grip flange and the second grip flange when the first arm and the second arm are in an open state is less than a grip slot opening width of an attachment bracket.

17. The solar mount of claim 15, wherein a first distance between outer ends of the first grip flange and the second grip flange when the first arm and the second arm are in a closed state is greater than a grip slot opening width of an the attachment bracket.

18. The solar mount of claim 15, wherein when the first grip flange and the second grip flange are positioned in a central grip slot of an attachment bracket and a fastener is tightened to compress the first arm and the second arm together, the first and second grip flanges compress into sides of the central grip slot.

* * * * *